United States Patent
Kronander et al.

(10) Patent No.: US 9,622,152 B2
(45) Date of Patent: Apr. 11, 2017

(54) METHOD AND DEVICE RELATING TO CONNECTION TO HOTSPOT

(75) Inventors: Jonas Kronander, Knivsta (SE);
Yngve Selén, Uppsala (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 3 days.

(21) Appl. No.: 14/400,425

(22) PCT Filed: May 15, 2012

(86) PCT No.: PCT/SE2012/050515
§ 371 (c)(1),
(2), (4) Date: Nov. 11, 2014

(87) PCT Pub. No.: WO2013/172749
PCT Pub. Date: Nov. 21, 2013

(65) Prior Publication Data
US 2015/0139097 A1    May 21, 2015

(51) Int. Cl.
*H04W 48/10*    (2009.01)
*H04W 76/02*    (2009.01)
(Continued)

(52) U.S. Cl.
CPC .......... *H04W 48/10* (2013.01); *H04W 48/12* (2013.01); *H04W 72/005* (2013.01); *H04W 76/02* (2013.01); *H04W 16/32* (2013.01)

(58) Field of Classification Search
CPC ..... H04W 16/14; H04W 16/24; H04W 16/32; H04W 72/02; H04W 72/04;
(Continued)

(56) References Cited

U.S. PATENT DOCUMENTS 8,548,465 B2 * 10/2013 Mueck .................. H04H 20/24
                                                     370/329
9,037,175 B2 *  5/2015 Kronander ............ H04W 48/10
                                                     455/434
(Continued)

FOREIGN PATENT DOCUMENTS

EP         2323442 A1     5/2011

OTHER PUBLICATIONS

Salient et al, "Cognitive Pilot Channels: A Radio Enabler for Spectrum Awareness and optimized Radio Resource Management", ICT-MobileSummet 2009 Conference Proceedings, Paul Cunninghum and Miriam Cunninghame (Eds), IIMC Internation Information Management Corporation, 2009, ISBN: 978-1-905824-12-0.*

(Continued)

*Primary Examiner* — Luat Phung
*Assistant Examiner* — Thomas R Cairns
(74) *Attorney, Agent, or Firm* — Patents on Demand P.A.; Brian K. Buchheit; Scott M. Garrett

(57) ABSTRACT

Embodiments comprise a method and a corresponding device (11) for facilitating connection to a wireless hotspot (5) with associated coverage area (7). The device (11) obtains local CPC information (27) which relates to the hotspot (5). The device (11) then transmits the local CPC information (27) in an area that corresponds to the coverage area (7) of the hotspot (5) The local CPC information (27) may toe transmitted using radio resources which have been reserved for use in outband broadcast. CPC transmissions. The transmission of local CPC information (27) may fee performed using a resource sharing scheme (200b), Embodiments further comprise a method in a user equipment and a corresponding user equipment (9). The user equipment (9) receives, a transmission (69;87) of local CPC information (Continued)

(27) relating to a wireless hotspot (5) and may then use the received local CPC information to efficiently connect (71; 93) to the hotspot (5).

18 Claims, 9 Drawing Sheets

(51) Int. Cl.
  *H04W 48/12* (2009.01)
  *H04W 72/00* (2009.01)
  *H04W 16/32* (2009.01)

(58) Field of Classification Search
  CPC ......... H04W 72/0486; H04W 72/0453; H04W 72/0493; H04W 72/1257; H04W 72/08; H04W 72/00; H04W 72/005; H04W 48/10; H04W 48/12; H04W 74/08; H04W 74/0808; H04W 76/02
  USPC ......................................................... 370/329
  See application file for complete search history.

(56) References Cited

U.S. PATENT DOCUMENTS

| | | | |
|---|---|---|---|
| 2011/0111764 A1* | 5/2011 | Mueck | H04M 1/725 455/452.1 |
| 2012/0064902 A1 | 3/2012 | Kronander et al. | |
| 2013/0100893 A1* | 4/2013 | Sawai | H04W 16/14 370/328 |

OTHER PUBLICATIONS

Bourse, Didier et al., "The E2R II Flexible Spectrum Management (FSM) Framework and Cognitive Pilot Channel (CPC) Concept—Technical and Business Analysis and Recommendations", End-to-End Reconfigurability II ($E^2R$ II) White Paper, Nov. 2007, 1-52.

Jacobson, Kevin R. et al., "System Design and Throughput Analysis for Multihop Relaying in Cellular Systems", IEEE Transactions on Vehicular Technology. vol. 58, No. 8, Oct. 2009, 4514-4528.

Rom, Raphael et al., "Multiple Access Protocols: Performance and analysis", Springer-Verlag, New York, USA, Chapter 4, available online at http://www.cornnet.technion.ac.il/rom/PDF/MAP.pdf, 1990, 79-106.

Unknown, Author, "Reconfigurable Radio Systems (RRS); Feasibility Study on Control Channels for Cognitive Radio Systems", ETSI Draft TR 102 684 vo.0.11, Reference # DTR/RRS-03008, Sophia Antipolis Cedex, France, Mar. 2012, 1-42.

Unknown, Author, "Support for heterogeneous standards using CPC", End-to-End Efficiency (E3) White Paper, Version 0.4, NEC Technologies UK, Jun. 30, 2009, 1-22.

* cited by examiner

METHOD AND DEVICE RELATING TO CONNECTION TO HOTSPOT

TECHNICAL FIELD

The present invent ion pertains to the field of radio communications and in particular to the part of this field which is concerned with facilitating establishment of a connection between radio units, such as user equipments, and a wireless hotspot.

BACKGROUND

The number of radio access technologies available for uses such as cellular telephony and mobile broadband has grown rapidly in the later years. In the beginning of the 1990ies there were only a few standards available, such as NMT, GSM and IS-95, used almost exclusively for voice telephony. Currently, many additional radio access technologies (RATs) have been developed, such as W-CDMA, CDMA2000, EDGE, IEEE 802.16 and LTE, to mention just a few. There is also a demand for multi-mode terminals, for improved coverage and to be able to use the same mobile terminal when traveling, so that a single terminal must be able to use several RATs.

To add to this already heterogeneous situation, there is a regulatory interest to increase flexibility when it comes to spectrum allocations. An advantage of this increased flexibility is that the radio environment can be adapted to current usage patterns, so that the limited radio resources may be more efficiently exploited. For example, different RATs may be allocated to different frequencies in different geographical locations, and these locations and frequency allocations may also change over time.

Some ways of providing information on how to connect to the RATs which are present in a geographic region have been presented with the common name CPC (Cognition enabling Pilot Channel or Cognitive Pilot Channel). This is, for example, described in E2R II White Paper, "The E2R II Flexible Spectrum Management (FSM) Framework and Cognitive Pilot Channel (CPC) Concept—Technical and Business Analysis and Recommendations". In a particular implementation of the CPC, the so-called outband broadcast CPC, the CPC is viewed as a RAT of its own using a particular predefined frequency, and an outband broadcast CPC transmitter broadcasts information on which RATs are available at different frequencies in the different locations covered by the outband broadcast CPC transmitter. In the solutions discussed today, different time slots are used for CPC information relating to different geographical areas, such that the information related to a particular area makes up only a small portion in time of the entire CPC broadcast. For example, a timeslot a can be used to transmit information on which RATs are available in an associated area A, timeslot b can transmit information related to area B, and so on. In one particular scenario of this approach, a coverage area of an outband broadcast CPC transmitter is divided in quadratic areas, so-called meshes.

Another new notion is so-called Dynamic Spectrum Access (DSA), which describes spectrum access where radio units are not limited to using fixedly allocated spectrum bands (such as their licensed spectrum), but rather adapt the spectrum bands and the RATs they use depending on conditions such as estimated throughput, latency requirements, spectrum availability etc. For instance, a communication system suffering from high load in its own licensed spectrum could dynamically access spectral bands owned by some other licensee to temporarily increase its throughput, as long as it does not cause unacceptable interference to the other licensee. As another example, a network of communicating nodes may change its operating frequency depending on current spectral conditions. Potentially, dynamic spectrum access can enable more efficient use of the limited radio spectrum resources. This is because several systems then share the same resources such that when one system requires only a small amount of spectrum, other systems experiencing higher loads can utilize a greater bandwidth.

A so-called hotspot is a device that that provides wireless communication services in a relatively small coverage area using low power transmissions, for example, compared with transmission powers used in a macro cell or similar. The coverage area of the hotspot is usually characterised by a high user density. The hotspot may, for example, be a WLAN access point, a pico base station or similar. With the introduction of more flexible and adaptable connection possibilities in user equipments (UEs) and an increasingly dynamic spectrum arena, the market for the introduction of local DSA capable hotspots becomes more attractive. A hotspot may, for example, by use of DSA mechanisms, obtain access to spectrum bands with more favorable propagation characteristics than what can be provided by, for example, today's unlicensed ISM (Industrial, Scientific and Medical) bands. Further, by novel spectrum techniques, the DSA hotspots may use discontiguous spectrum bands and/or channels and aggregate a large bandwidth allowing for very high data rates and capacity.

To connect to a conventional WLAN hotspot, UEs need to scan for WLAN access points in a specific frequency range. Even though the frequency band where the hotspot is operating and the RAT used are well known, this scanning is rather slow and power consuming. With the introduction of DSA, a UE wanting to connect to a hotspot has even less information on where, in frequency, to scan for the hotspot or on what RAT is used by the DSA hotspot. These additional degrees of freedom may significantly increase the average scanning time.

To be able to attract users to a hotspot such as e.g. a DSA hotspot, nearby UEs should be able to more quickly connect to the hotspot without a time and energy consuming spectrum scanning procedure. It may even be so that long average scanning times would discourage potential customers to search for the hotspot. An outband broadcast CPC transmitter with a large service area will most likely not be able to cope with many local DSA hotspots as this would generate too much information to broadcast, i.e., the time required to listen and decode the CPC information would be too long. Furthermore, the outband broadcast CPC approach requires some degree of UE positioning, since the UE needs to know which CPC information is relevant for its present location. A hotspot typically has a small coverage area, which means that the positioning would have to be rather precise. This may put the additional requirement of integrated GPS or a similarly precise positioning system in all UEs which are potential customers to hotspot services. Moreover, as the DSA hotspots change their operating frequencies and possibly adapt the used RAT to a local (in both time and space) spectrum situation, it will be difficult to keep this information updated in an outband broadcast CPC system. Finally, a hotspot owner may, for various reasons, not want to register their hotspot to the entity that manages the outband broadcast CPC. One reason for this may be that this entity could be managed by a competitor.

A problem addressed by the present invention is therefore to be able to overcome or at least mitigate at least one of the above-indicated difficulties.

SUMMARY

According to one aspect, the above stated problem is addressed by the provision of a method for a device for facilitating connection to a wireless hotspot. The wireless hotspot is here operative in an associated coverage area. The device obtains local Cognitive Pilot Channel (local CPC) information which relates to the hotspot. The device then transmits the local CPC information in an area that corresponds to the coverage area of the hotspot. An associated advantage is that user equipments are provided with local CPC information that allows quick and efficient connection to the hotspot independently of transmissions from outband broadcast CPC transmitters. Moreover, the method puts very little demand on user equipments. For example, the user equipments may dispense with frequency scanning, and there is essentially no requirement on having advanced positioning capabilities.

In exemplary embodiments, the local CPC information is transmitted using radio resources which have been reserved for use in outband broadcast CPC transmissions. This further lowers the demand on user equipments, since user equipments capable of receiving outband broadcast CPC transmissions can relatively easily be configured to receive also the local CPC information.

In exemplary embodiments, the device may obtain area element location information associated with one more area elements of a coverage area of an outband broadcast CPC transmitter. Based on the area element location information, the device identifies one or more area elements which have a distance to the hotspot which is greater than a threshold value. For at least one such identified area element, the device identifies outband broadcast CPC radio resources allocated for that area element. The device then transmits the local CPC information using at least a portion the identified allocated radio resources. An advantage here is that the transmissions of local CPC information can be made with radio resources which are reserved for outband broadcast CPC transmissions while still effectively avoiding harmful interference to the transmissions from the outband broadcast CPC transmitter.

In exemplary embodiments, the device may transmit the local CPC information using a resource sharing scheme which shares radio resources with transmissions of local CPC information relating to one or more other wireless hotspots. An advantage is that the local CPC information relating to multiple wireless hotspots will not cause harmful interference to each other. This is a great benefit, particularly in locations with a high demand on wireless services such as airports, train stations, shopping malls, sports arenas etc.

According to another aspect, the above-stated problem is addressed by the provision of a device for carrying out the above indicated method.

According to a further aspect, the above-stated problem is addressed by the provision a method for a wireless user equipment. This method comprises receiving a transmission of local CPC information relating to a wireless hotspot. The method further comprises connecting to the hotspot using the received local CPC information. An advantage here is that the user equipment by having accesses to local CPC information can connect to the hotspot in a more efficient manner. For example, the connection can be made quicker and with less power consumption. According to yet another aspect, the above-stated problem is addressed by the provision of a user equipment configured to carry out this method.

The persons skilled in the art will appreciate that further aspects, objects and advantages may be associated with the exemplary non-limiting embodiments set out in the detailed description and the drawings.

The invention will now be described further using preferred embodiments and referring to the drawings.

DETAILED DESCRIPTION

Figure 1:
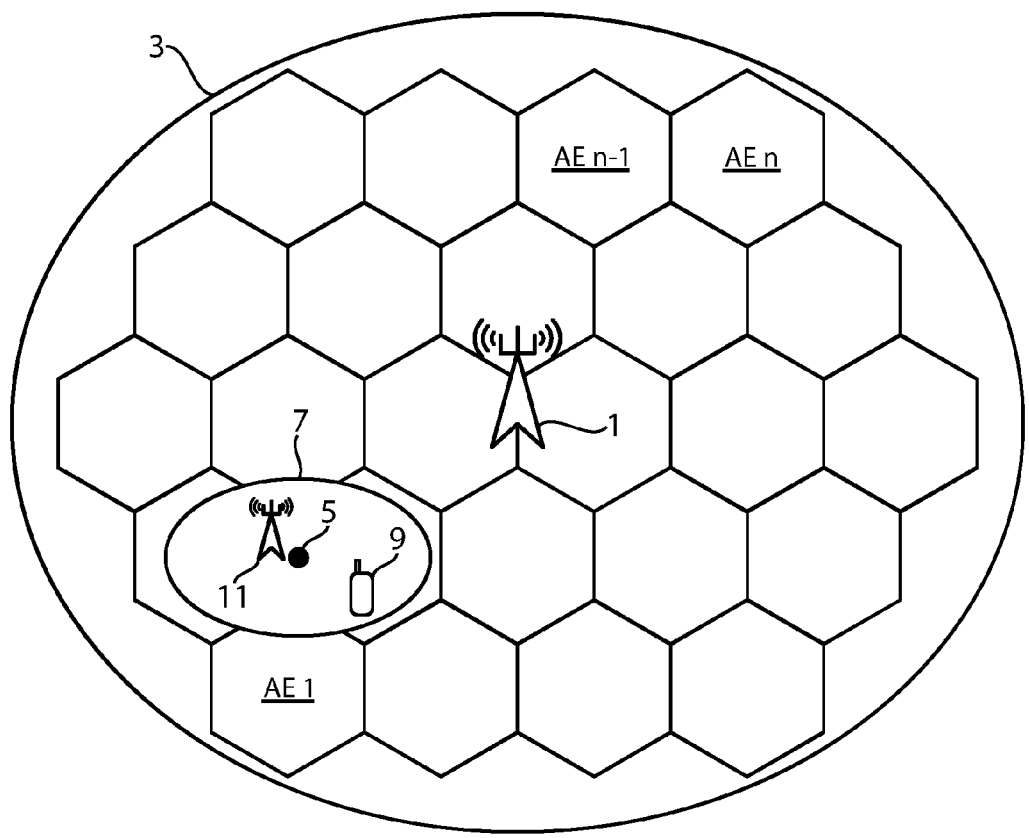
FIG. 1 is a schematic view illustrating an exemplary scenario where embodiments of the invention may be employed.
Figure 2:
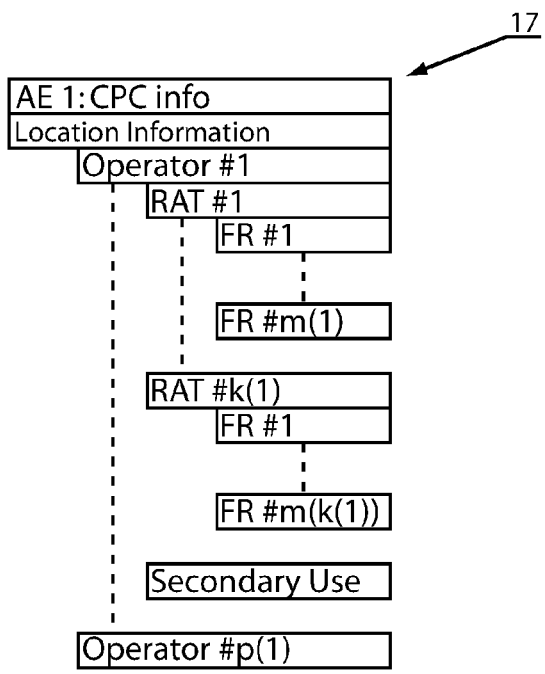
FIG. 2 is a diagram illustrating an exemplary transmission format for CPC information.

FIG. 1 is a schematic view illustrating an exemplary situation where embodiments of the present invention may be advantageously employed. In FIG. 1, an outband broadcast CPC transmitter 1 is present. The outband broadcast CPC transmitter 1 broadcasts outband broadcast CPC information (CPC information for short) in a coverage area 3, which is here subdivided into a number of smaller areas, herein referred to as AEs (Area Elements). In the example of FIG. 1, there are n AEs, wherein AE 1, AE n−1 and AE n are explicitly referenced in the figure. For the purpose of illustration only, the AEs have been given hexagonal shapes. But the AEs may naturally have other shapes as well. For example, if the above-mentioned mesh concept is used, then each AE may consist of one or more meshes. The AEs will then have quadratic shapes, or be composed of a number of quadratic shapes. The AEs may also be overlapping although the figure shows non-overlapping AEs. Associated with each AE there are various active wireless communications systems (not shown) which have been registered with the outband broadcast CPC transmitter 1. The CPC information transmitted by the outband broadcast CPC transmitter 1 comprises information which explains to UEs located in the various AEs how to quickly connect to the above-mentioned wireless communication systems. The CPC information relating an AE will normally comprise information on operators that provide wireless communication systems and associated services in the AE. For each operator, the CPC information will normally indicate one or more RATs supported by the operator and for each RAT the CPC information will also indicate the frequency ranges allocated to that particular RAT. An exemplary transmission format 17 for the CPC information associated with an AE (here by way of example the AE 1 of FIG. 1) is shown in FIG. 2. The transmission format 17 comprises a first field which provides an indication that the CPC information relates to the AE 1. There is also provided a field with location information for the AE 1, which indicates a geographical location of the AE 1. This may be GPS coordinates or some other geographical coordinates, the shape and/or size of the AE, etc. The CPC format 17 of FIG. 2 further includes information fields identifying a number p(l) of operators which are registered with the outband broadcast CPC transmitter 1 and which provide communication services in the AE 1. For each operator, the CPC information format comprises one or more information fields indicating the one or more RATs employed by the operator in the AE 1. Furthermore, there are information fields indicating one or more frequency ranges that may be used for each RAT. In order not to overcomplicate the drawing of FIG. 2, this is shown in detail only for the operator #1. Consequently, the operator #1 provides communication services using k(l) RATs in the AE 1. Then for each RAT of the operator #1 there is one or more information fields that indicate the applicable FRs (Frequency Ranges) for that RAT. For example, for the RAT #1 of the operator #1 there are a number m(l) of FRs which may be used for communication services with the RAT #1 in the AE 1.

A UE located within the coverage area 3 of the outband broadcast CPC transmitter 1 may listen to the transmitted CPC information and then identify the AEs relevant for its current location. The UE may then also use the CPC information in order to quickly connect to desired communication systems without engaging in a time and power consuming frequency scanning.

In FIG. 1, there is also shown a hotspot, here by way of example in the form of a DSA hotspot 5, which provides communication services such as Internet access or voice in an associated coverage area 7. FIG. 1 is not drawn to scale, and it should be mentioned that the coverage area 7 of the DSA hotspot 5 may be much smaller than an AE. In FIG. 1, a UE 9 is currently within the coverage area 7 of the DSA hotspot 5. The UE 9 may want to be able to connect to the DSA hotspot 5 without having to resort to frequency scanning.

The term UE (user equipment) is herein used as a generic term encompassing any device which includes or has access to radio equipment for exploiting wireless communication services. Non-limiting examples are mobile or fixed radio terminals/phones, computers, sensors and vending machines or other machines (cars, household appliances etc.) that utilize wireless communication services e.g. for receiving instructions or upgrades or for reporting. The term is also intended to encompass so-called mobile hotspots such as e.g. the commercially available MiFi® (My WiFi) solution and similar".

As mentioned, it will in general be difficult for the outband broadcast CPC transmitter 1 to handle information relating to hotspots such as e.g. DSA hotspots. Embodiments of the invention therefore suggest the introduction of a device, herein referred to as a local outband CPC transmitter 11 (or local CPC transmitter for short). The local CPC transmitter 11 may advantageously be designed as a small inexpensive device configured for transmissions over ranges similar to the coverage area 7 of the DSA hotspot 5. The local CPC transmitter 11 is preferably placed in the vicinity of the DSA hotspot 5, but may also be integrated with the DSA hotspot equipment. The local CPC transmitter 11 is adapted to obtain and transmit local CPC information relating to the associated DSA hotspot 5. The local CPC information comprises information that allows a UE to connect to the DSA hotspot 5 that the local CPC transmitter is supporting without frequency scanning. Preferably, the local CPC information will comprise at least information about RAT(s) and FR(s) used by the DSA hotspot 5. A UE, such as the UE 9, may receive the local CPC information transmitted by the local CPC transmitter 11 and use this information to connect to the DSA hotspot 5 in a quick and efficient manner. As mentioned above, it is suggested that the local CPC transmitter 11 limits its transmission of local CPC information to an area that essentially corresponds to the coverage area 7 of the DSA hotspot 5. This is advantageous since it allows UEs which do not have positioning capabilities, such as e.g. GPS (Global Positioning System), to efficiently use the local CPC information and the DSA hotspot 5. That is, if a UE can receive the local CPC information, it is also within the coverage area 7 of the DSA hotspot 5 and therefore knows that it can use the CPC information for connecting to the DSA hotspot 5. The local CPC transmitter 11 can adapt its coverage area to that of the hotspots by using similar, or even the same, antennas and transmission powers as that of the hotspot. In particular embodiments (see below), the transmission power may need to be somewhat larger, though, provided compensation for outband broadcast CPC interference is required.

Note that the term local CPC transmitter should not be interpreted such that this device may not have receiving capabilities as well, as will be discussed in greater detail below.

The local CPC transmitter 11 may, for its transmission of local CPC information, use a specified/standardized unlicensed frequency. Alternatively, the local CPC transmitter 11 may transmit the local CPC information using radio resources that have actually been reserved for transmissions by the outband broadcast CPC transmitter 1. For example, one or more outband broadcast CPC frequency bands may be used by the local CPC transmitter for transmission of local CPC information. Herein, the term overlay will be used for this type of transmission, since, if the local CPC transmitter is located within the coverage area of the outband broadcast transmitter 1, the transmission from the local CPC transmitter will be overlaid any transmission from the outband broadcast CPC transmitter 1 occurring at the same time and using the same frequency band. However, in order to limit the number of introduced terms, the term overlay will be used herein also if no outband broadcast CPC transmitter is present, i.e. when the local CPC transmitter 11 is not within the coverage area of any outband broadcast CPC transmitter but still transmits local CPC information using radio resources that have been reserved for outband broadcast CPC transmissions.

Overlay may be done in a "nice" way, as described below, or in a "mean" way, which would be to just transmit on the same frequency at the same time as the outband broadcast CPC transmitter 1 and thus make the outband broadcast CPC transmission impossible to decode at a UE. It is, however, likely that regulatory rules for the use of CPC will not allow this type of behavior, but the possibility is still included here; and, of course, if no outband broadcast CPC transmitter is present, "mean" overlay transmissions can be performed without any problem.

As mentioned above, overlay may require some caution not to break regulations, and for this purpose the "nice" overlay option is introduced. Nice overlay is possible whenever the outband broadcast CPC transmissions are performed such that CPC information for separate AEs is broadcasted in separate timeslots. These broadcast schemes use time slots, possibly of different durations, for the outband broadcast CPC information. Different timeslots are used to distribute CPC information relevant for different AEs in the coverage area 3 of the outband broadcast CPC transmitter 1. When using nice overlay, the local CPC transmitter 11 transmits its information only in the timeslots during which the outband broadcast CPC transmitter 1 transmits information related to AEs which are located sufficiently far away from the local CPC transmitter 11, in the sense that UEs that may be interested in using communication services provided in these AEs are not interfered by the transmission of local CPC information from the local CPC transmitter 11. Various preferred non-limiting ways of determining whether an AE is sufficiently far away will be described later on.

Figure 3:
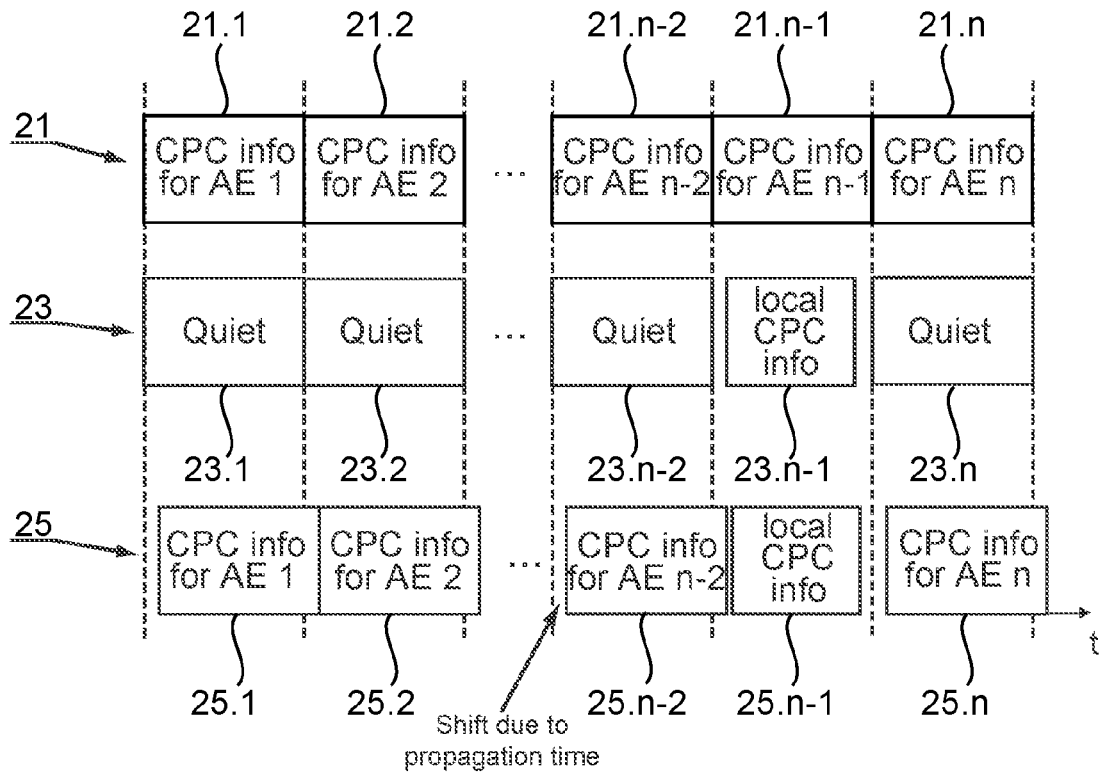
FIG. 3 is diagram illustrating transmission and reception schemes in accordance with an exemplary embodiment.

FIG. 3 is a diagram showing transmission and reception schemes that illustrate an example of the nice overlay option. In FIG. 3, the outband broadcast CPC transmitter 1 uses a transmission scheme 21 for the transmission of CPC information in a reserved frequency band. The transmission scheme 21 involves transmission of CPC information in a number n of time slots 21.1-21.$n$, which are repeated cyclically. Each time slot contains CPC information relating to one AE associated with the outband broadcast CPC transmitter 1. Consequently, in this example, the time slot 21.1 contains CPC information relating to the AE 1, the time slot 21.2 contains CPC information relating to the AE 2, and so on. FIG. 3 also illustrates an exemplary nice overlay transmission scheme 23 for transmitting local CPC information from the local CPC transmitter 11. The transmission scheme 23 uses the same reserved frequency band as the transmission scheme 21 and is synchronised to the time slot structure of the transmission scheme 21. However, the local CPC transmitter 11 only transmits local CPC information in the time slot 23.$n$-1 corresponding to the time slot 21.$n$-1 of the transmission scheme 21. In the other time slots, 23.1-23.$n$-2 and 23.$n$, the local CPC transmitter 11 is quiet. The time slot 21.$n$-1 is here associated with the AE n-1, which here is considered to be sufficiently far away from the local CPC transmitter 11 and the DSA hotspot 5, so that any UEs located within or in the vicinity of the AE n-1 will not be interfered by the transmission of local CPC information from the local CPC transmitter 11. The local CPC transmitter 11 is of course not limited to transmitting local CPC information in only one time slot but can use several time slots, provided the associated AEs are sufficiently far away from the local CPC transmitter 11. FIG. 3 further shows a reception scheme 25 of a UE, such as the UE 9, which is located within the coverage area 7 of the DSA hotspot 5. The reception scheme 25 involves reception in time slots 25.1-25.$n$ corresponding to the time slots 21.1-21.$n$, but with a slight shift due to propagation delay. In the time slots 25.1-25.$n$-2 and 25.$n$, the UE receives CPC information from the outband broadcast CPC transmitter 1. However, in the time slot 25.$n$-1 the transmission from the local CPC transmitter 11 is overlaid the transmission from the outband broadcast CPC transmitter, so that the UE receives local CPC information in this time slot. If the US so desires, it may then use the received local CPC information when connecting to the DSA hotspot 5, without any frequency scanning.

An advantage with the overlay approach in general is that a UE that is capable of receiving CPC information from an outband broadcast CPC transmitter will also with no or only limited modification be able to receive local CPC information. The overlay approach is therefore very cost effective. With the nice overlay approach it is true that the transmission from the outband broadcast CPC transmitter will not be decodable to UEs close to the local CPC transmitter during the any timeslots containing the overlaid local CPC information. However, since the CPC information in these time slots only relate to AEs far away from any UE located near the DSA hotspot, this information is most likely not interesting for the UE anyway.

The nice overlay approach is easily applied to situations where the outband broadcast CPC transmitter transmits CPC information in a predictable manner, e.g. in a cyclic, or almost cyclic, manner. With a receiver capable to receive the transmissions from the outband broadcast CPC transmitter at the hotspot, it is thus possible to predict when information related to AEs located far away is transmitted. Moreover, there may be CPC implementations where the AE location information is transmitted at a beginning of a message and the information relating to RATs etc. are transmitted at a later part of the message. In such an implementation, the local CPC transmitter may first decode the AE location information and then if the AE location is sufficiently far away overlay the rest of the information relating to this AE with the local CPC information.

In this approach, the receiving UE does not obtain all the CPC information transmitted from the wide area broadcast CPC transmitter. The local CPC transmitter identifies on which timeslots the least relevant information to a general UE in its coverage area is and overlays its own signal on this timeslot; thus the CPC information relating to this timeslot will not be received by the UE.

Above, a time slotted transmission scheme was assumed, by way of example, for the outband broadcast CPC transmissions. The nice overlay approach is, however, not limited to time slotted transmissions. For example, the outband broadcast CPC transmitter may be designed so that different parts of the allocated spectrum, e.g., different frequency intervals, are associated with different AEs, or that different codes are associated with different AEs, or any combination of these (and the time slotted structure described above). The point is that CPC information for each AE is communicated using particular radio resources in a predictable manner so that is possible to ascertain which radio resources have been allocated for communicating CPC information relating to a particular AE. It is therefore possible to use radio resources for overlay transmissions so that these radio resources are associated solely with AEs that are sufficiently distant from the local CPC transmitter 11 and the DSA hotspot 5.

For some locations, such as train stations, airports, etc, where a user density is high, several DSA hotspots, who all want to announce their presence using local CPC transmitters, may be present. If these DSA hotspots are geographically close, there is a risk of collisions between the local CPC transmissions. According to exemplary embodiments of the invention, it is therefore suggested to introduce resource sharing in order to eliminate or at least reduce this risk. The resource sharing method will naturally depend on the type of available radio resources. Below, some advantageous non-limiting approaches for resource sharing are presented.

One approach to resource sharing is to use a Code Division Multiple Access (CDMA) scheme, where the local CPC transmitters use codes which may be orthogonal or non-orthogonal to other local CPC transmitters. Perfectly orthogonal codes require some form of synchronization, which may be difficult to achieve for a distributed system. The number of codes could be selected based upon the amount of the outband broadcast CPC resources which can be overlaid. A direct sequence spread spectrum scheme can be used, or a fast frequency hopping spread spectrum scheme, à la Bluetooth.

Another approach to resource sharing is to have each local CPC transmitter randomly select a subset of the radio resources which are associated with AEs sufficiently far away. The local CPC transmitters then overlay their transmissions over the selected subset only. The randomization of the subset of radio resources is preferably repeated now and then, for diversity purposes.

Yet another approach to resource sharing is that the local CPC transmitters may attempt to use the same resource, but implement a multiple access protocol that effectively deals with or to some extent avoids collisions, for example, using variants of so-called CSMA (Carrier Sense Multiple Access), as described in, for example, Raphael Rom, Moshe Sidi, "Multiple Access Protocols: Performance and analysis," Springer-Verlag, New York (1990). Chapter 4, which is also available online at:
www.comnet.technion.ac.il/rom Some game theoretic approach could be combined with sensing for other local CPC transmitters, to try to converge to a good "close to static" resource sharing scheme (the number of local CPC transmitters should not change that often).

In resource sharing algorithms it can be helpful to know how many entities the radio resources have to be shared with. One way of assessing this is to have a local CPC transmitter mark its local CPC transmissions with an identifying sequence which identifies the signal as a local CPC transmission. Furthermore, the local CPC transmission may also include a unique (at least with high probability) identifier (e.g. a random number) such that the local CPC transmitters can, by means of receiving signals from other local CPC transmitters, find how many local CPC transmitters they need to share the available resources with.

Figure 4:
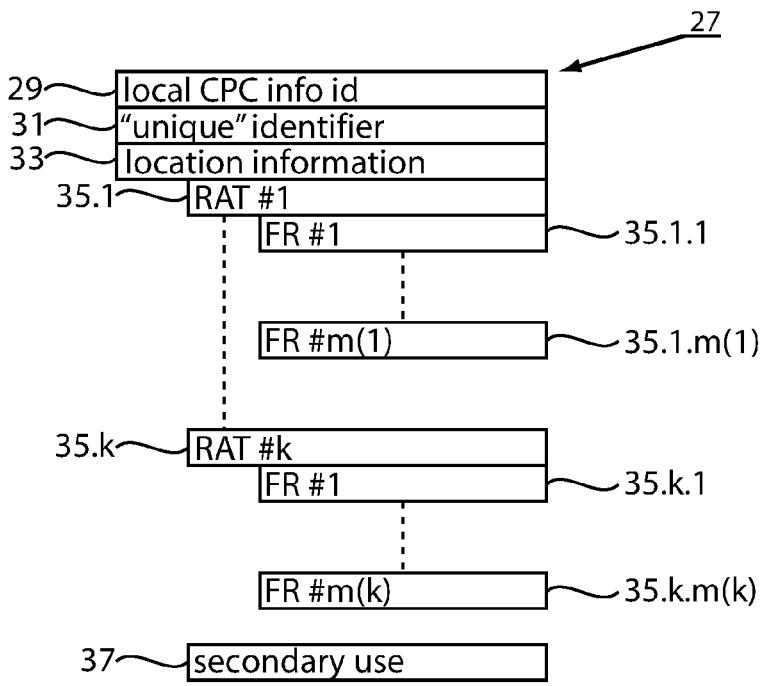
FIG. 4 is a diagram illustrating a transmission format for local CPC information in accordance with an exemplary embodiment.

A purely exemplary transmission format 27 for the local CPC information is shown in FIG. 4. The transmission format comprises a local CPC information identifier field 29 (optional), which includes a predefined identifier sequence that identifies the transmission as being a transmission of local CPC information. Furthermore, a unique identifier field 31 (optional) is included. This field comprises an identifier which uniquely identifies the local CPC transmitter, e.g. the local CPC transmitter 11, that performs the transmission. The transmission format further comprises a location information field 33 (optional), which provides information about the location of the local CPC transmitter. The transmission format further comprises RAT information fields 35.1-35.$k$ which identify a number ($k$) of RATs that are used by the DSA hotspot, e.g. the DSA hotspot 5, serviced by the local CPC transmitter. For each identified RAT, the transmission format comprises frequency range fields 35.1.1-35.$k.m(k)$ with information that identifies the FRs that can used with each RAT. Here, $m(p)$ denotes the number of FRs that are associated with the RAT #$p$, which is the RAT identified by the RAT information field 35.$p$, where $1 \leq p \leq k$. In the example of FIG. 4, there is also a secondary use field 37 (optional), which identifies radio resources and possibly associated RAT(s) that may be engaged in a secondary use for accessing communication services provided by the DSA hotspot or some other entity.

The transmission format 27 of FIG. 4 is a non-limiting example, and other transmission formats for the local CPC information can equally well be used. For example, the transmission format for the local CPC information may essentially be a copy of the transmission format used for transmission of CPC information from an outband broadcast CPC transmitter, such as the outband broadcast CPC transmitter 1 of FIG. 1. In this case, if overlay is used, the transmission of local CPC information will essentially be impossible for a UE to distinguish from the transmission of CPC information from the outband broadcast CPC transmitter. Consequently, the UE does not have to modify its operation but can treat the local CPC information in much the same way as normal CPC information.

Figure 5:
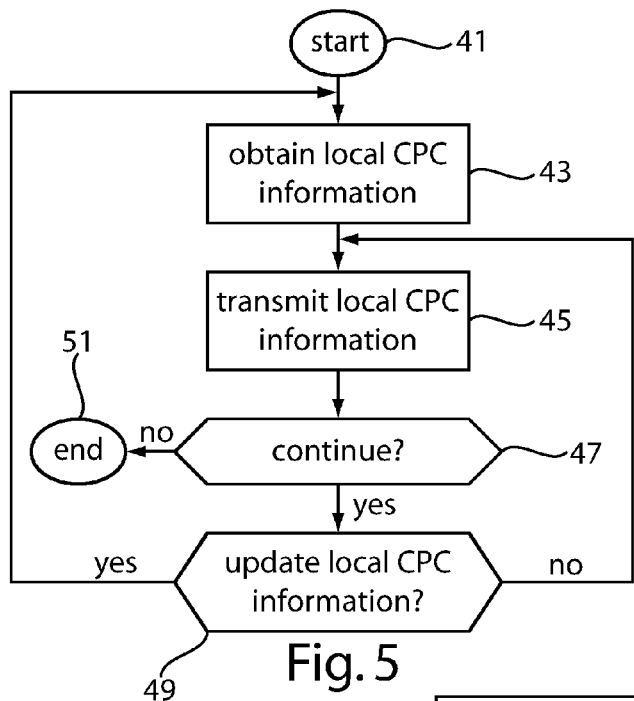
FIG. 5 is a flowchart illustrating methods of operation of a local CPC transmitter in accordance with exemplary embodiments.
Figure 14:
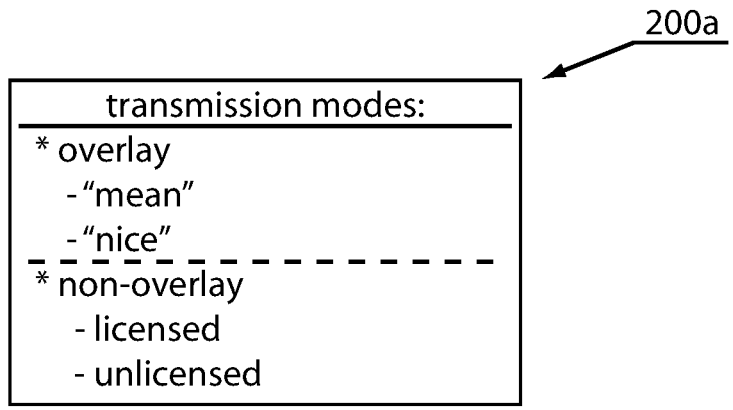
FIG. 14 is a table illustrating exemplary transmission modes.
Figure 15:
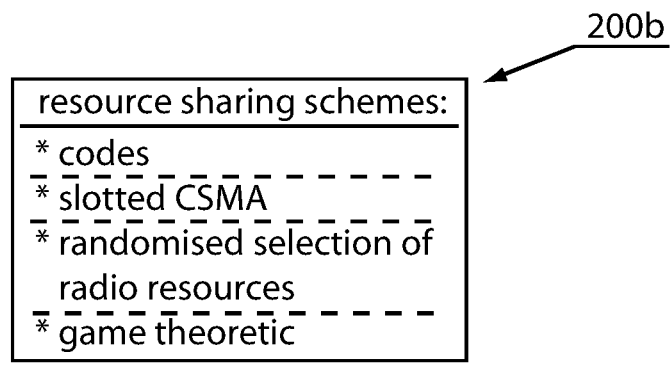
FIG. 15 is a table illustrating exemplary resource sharing schemes.

FIG. 5 is a flowchart that illustrates a method by which a local CPC transmitter, such as the local CPC transmitter 11, may be adapted to operate in accordance with an exemplary embodiment of the invention. At a block 43, the local CPC transmitter obtains local CPC information relevant to a DSA hotspot, such as the local DSA hotspot 5, that the local CPC transmitter serves. The local CPC transmitter may, for example, receive the local CPC information from the DSA hotspot, e.g. from a control unit of the DSA hotspot. After having obtained the local CPC information, the local CPC transmitter transmits the local CPC information at a block 45. The local CPC transmitter adapts its transmission such that the local CPC information can be received and decoded only in an area which essentially corresponds to a coverage area of the DSA hotspot. As mentioned earlier, the transmission of the local CPC information may be performed using various modes. For the convenience of the reader, some of these modes are summarised in a table 200$a$ in FIG. 14. The transmission modes thus may comprise both overlay and non-overlay transmissions. The overlay transmissions may be performed, as discussed earlier, using either the "mean" overlay approach or the "nice" overlay approach. Non-overlay transmissions can be performed using one or more licensed frequency bands or using one or more unlicensed parts of the spectrum. Furthermore, the transmission of local CPC information may optionally be performed using one or more forms of resource sharing schemes, as discussed earlier. For the convenience of the reader some of the above-mentioned resource sharing schemes are summarised with a table 200*b* in FIG. 15. Consequently, the resource sharing may, for example, utilise codes, slotted CSMA, randomized selection of radio resources or a game theoretic approach, or any combination of these schemes. In this exemplary embodiment, the local CPC transmitter also determines, at a block 47 (optional), whether to continue its operation or not. If the local CPC transmitter determines not to continue, the operation ends at a block 51. There may be various reasons for the local CPC transmitter not to continue; for example, the local CPC transmitter or the hotspot may be due for maintenance or switched off during certain hours (e.g., during closing hours in a mall). If the local CPC transmitter determines to continue, the local CPC transmitter then, in this exemplary embodiment, determines whether or not it is time to update the local CPC information at a block 49. If the local CPC transmitter determines that it is time to update the local CPC information, the method returns to the block 43, otherwise the method returns to the block 45. The local CPC transmitter may decide that it is time to update the local CPC information for various reasons; for example, the local CPC transmitter may seek to update the local CPC information in a periodic manner or based on an indication, e.g. in the form of a message, from the DSA hotspot that new local CPC information is available.

Figure 6:
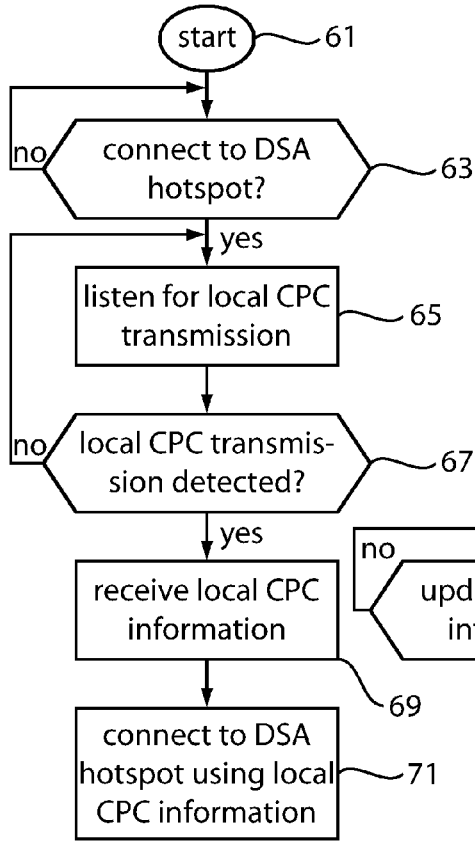
FIG. 6 is a flowchart illustrating methods of operation of a user equipment in accordance with exemplary embodiments.
Figure 7:
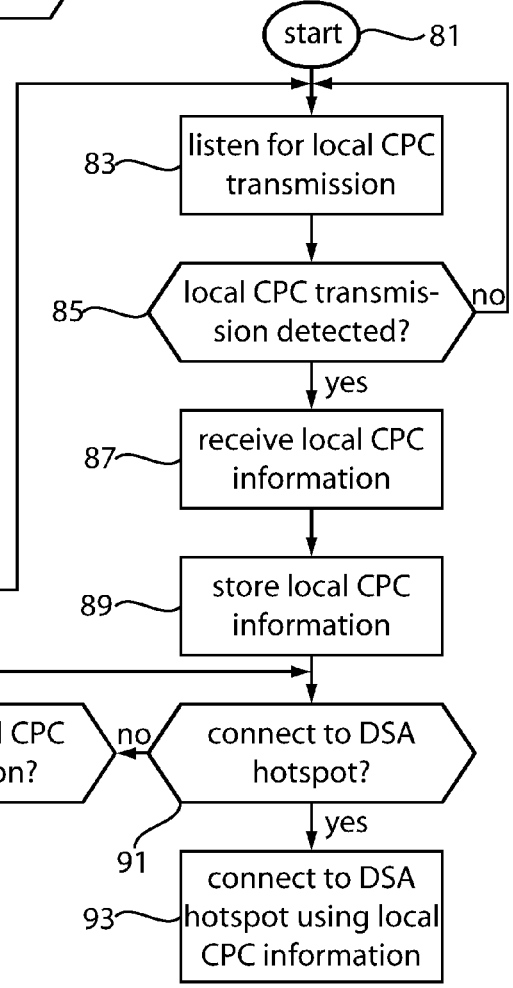
FIG. 7 is a flowchart illustrating methods of operation of a user equipment in accordance with exemplary embodiments.

FIGS. 6 and 7 are flowcharts that illustrate methods of operation of a user equipment, such as the UE 9, according to exemplary embodiments according to the invention. In both cases it is assumed that the transmission of local CPC information from a local CPC transmitter, such as the local CPC transmitter 11, is performed such that the user equipment is made aware of the fact that the local CPC information relates to a DSA hotspot, such as the DSA hotspot 5.

In FIG. 6, after a start 61, the user equipment checks, at a block 63, whether it is currently desirable to connect to a DSA hotspot; e.g., the UE searches for a connection in general and a DSA hotspot is one possible and acceptable means of connecting to the Internet, or the cost of connecting to a DSA hotspot may generally be lower than that of connecting to another service. If, at the block 63, the user equipment finds that it is currently not desirable to connect to a DSA hotspot, the user equipment will repeat the check at the block 63, e.g. regularly, until it is desirable to connect to the DSA hotspot. Once it is considered desirable to connect to the DSA hotspot, the user equipment starts to listen for transmissions of local CPC information at a block 65. Note that this could be part of a general search for a connection through the CPC. If the user equipment detects, at a block 67, a transmission of local CPC information, the user equipment then starts to receive the local CPC information at a block 69. After having received the local CPC information, the user equipment connects to the DSA hotspot using the received local CPC information at a block 71.

In FIG. 7, after a start 81, a user equipment, such as the UE 9, listens at a block 83 for transmissions of local CPC information from a local CPC transmitter, such as the local CPC transmitter 11. A check is then made, at a block 85, whether a transmission of local CPC information has been detected. If not, the user equipment will continue to listen for local CPC information at the block 83 until a transmission of local CPC information has been detected at the block 85, and when this occurs the user equipment will receive the local CPC information at a block 87. The received local CPC information is then stored, e.g. in a data storage device such as a memory, at a block 89. Thereafter, at a block 91, the user equipment checks whether it is currently desirable to connect to the DSA hotspot. If so, the user equipment will connect to the DSA hotspot using the stored local CPC information at a block 93. If it is not desirable to connect to the DSA hotspot, the method continues at a block 95, where the user equipment checks whether the local CPC information should be updated; for example, the currently stored local CPC information may be considered too old, so that an update is necessary. If, at the block 95, it is decided to update the stored local CPC information, the method returns to the block 83, otherwise the method returns to the block 91.

Consequently, a central and common feature of the exemplary methods of the FIGS. 6 and 7 is that the user equipment receives local CPC information from the local CPC transmitter and uses this local CPC information when connecting to the DSA hotspot which is served by the local CPC transmitter. In the method of FIG. 6, the user equipment only listens for local CPC information once it has been established that it is desirable to connect to the DSA hotspot. However, in the method of FIG. 7, local CPC information is received and stored prior to deciding to connect to the DSA hotspot. Connection to the DSA hotspot may take a little bit longer with the method of FIG. 6. On the other hand, there is no need to regularly receive and store local CPC information for potential later use. Hence each method has its advantages as well as its drawbacks.

Figure 8:
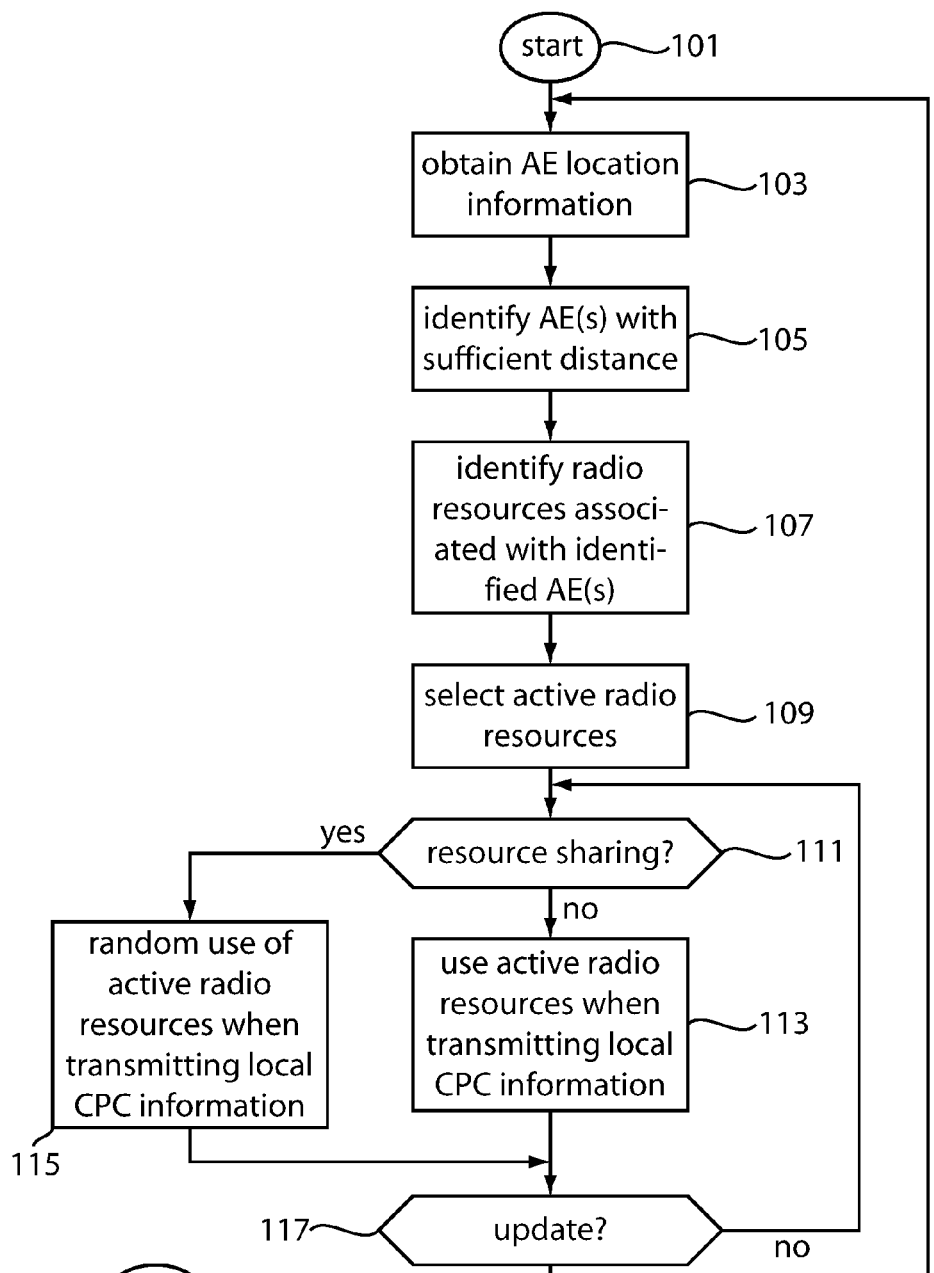
FIG. 8 is flowchart illustrating methods of operation of a local CPC transmitter in accordance with exemplary embodiments.

FIG. 8 is a flowchart that illustrates in more detail the use of the nice overlay approach in a local CPC transmitter in accordance with an exemplary embodiment of the invention. After a start 101, a local CPC transmitter, such as the local CPC transmitter 11, obtains AE location information at a block 103—here it assumed that the local CPC transmitter has already previously obtained the local CPC information. The AE location information provides information on the positioning of one or more AEs associated with an outband broadcast CPC transmitter, such as the outband broadcast CPC transmitter 1. Usually, however, the AE location information will relate to a plurality of AEs. The AE location information may relate to all AEs associated with the outband broadcast CPC transmitter. The local CPC transmitter services a DSA hotspot, such as the DSA hotspot 5, and the AE location information relating to an AE is such that it allows a distance from the DSA hotspot (or from the local CPC transmitter) to this AE to be estimated. For example, if the AE has a polygon shape (triangle, rectangle, pentagon etc.), the associated AE location information may comprise geographical coordinates for the corners of the polygon forming the AE. If, however, the polygon has equal sides, the AE location information for this AE may alternatively comprise a side length (which is the same for all sides), an indication of the number of sides, geographical coordinates for a centre of the polygon and geographical coordinates for one corner of the polygon. In a particular embodiment, the local CPC transmitter may obtain the AE location information by receiving CPC information transmitted from an outband broadcast CPC transmitter. Of course, in such a case, the local CPC transmitter includes or has access to a receiver capable of receiving a transmission of CPC information from the outband broadcast CPC transmitter. Alternatively, the local CPC transmitter may obtain the AE location information from some other source, e.g. from a database containing such information, or from a combination of sources. After the local CPC transmitter has obtained the AE location information, the local CPC transmitter will, at a block 105, identify, based on the AE location information, one or more AEs having estimated distances to the DSA hotspot (or local CPC transmitter) which are sufficiently large, that is, exceed a threshold value. Preferred non-limiting ways of establishing this threshold value will be described later on. It should be noted that an estimated distance to an AE does not normally reflect a distance to a centre of the AE but, instead, reflects a (shortest) distance to a circumference of the AE. The local CPC transmitter will normally make the distance estimation for each AE which is covered by the obtained AE location information. However, the local CPC transmitter may limit its investigation to fewer AEs if, for example, the number of AEs covered by the AE location information is very large. Having identified AEs with sufficient distance to the DSA hotspot, the local CPC transmitter identifies at a block 107, for at least one of the identified AEs, the outband broadcast CPC radio resources allocated to the at least one identified AE. In the following, however, it will be assumed that the local CPC transmitter has identified outband broadcast CPC radio resources relating to a plurality of the identified AEs. At a block 109, the local CPC transmitter determines which of the identified radio resources should be used for nice overlay transmission of local CPC information. Herein, these radio resources are referred to as active radio resources. This step is optional, however, and the local CPC transmitter may instead as a default include all radio resources identified at the block 107 in the active radio resources. Furthermore, in this exemplary embodiment, the method comprises, at a block 111, a determination on whether to use resource sharing. If it is determined that resource sharing should be used, the active radio resources are used in a random fashion when transmitting local CPC information at a block 115. Typically this entails that a (proper) subset of the active radio resources is selected at random. Thereafter, transmission of the local CPC information is made with the selected subset of the active radio resources. The selection of the subset may be re-made, for example, regularly. Of course, other forms of resource sharing may be used alternatively or additionally. If at the block 111, it is determined instead that no resource sharing should be used, the method continues with a block 113, where the local CPC transmitter transmits the local CPC information using all the active radio resources. In this exemplary embodiment, the method also comprises, at a block 117 (which follows either the block 113 or the block 115), a determination (optional) on whether to perform an information update. If it is determined that an information update is to be made at the block 117, the method returns the block 103, otherwise the method returns to the block 111.

Figure 9:
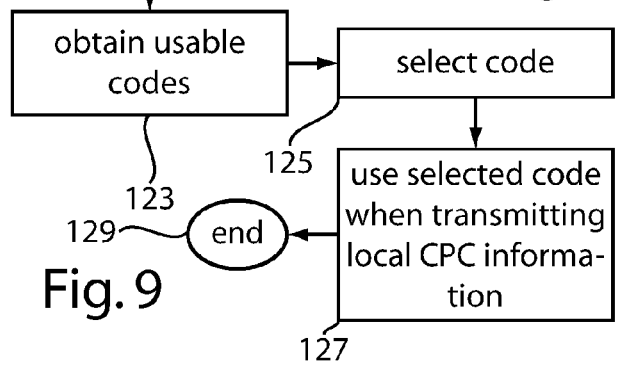
FIG. 9 is flowchart illustrating a method of using coded transmission of local CPC information in accordance with an exemplary embodiment.

FIG. 9 is a flowchart that illustrates a use of codes when transmitting local CPC information from a local CPC transmitter, such as the local CPC transmitter 11. After a start 121, the local CPC transmitter obtains at a block 123 a set of usable codes, e.g. by detecting other local CPC transmissions during a period of time and determining from detected other local CPC transmissions what codes are already in use. At a block 125, the local CPC transmitter selects a code from the set. This selection may be done by randomly selecting a code or via a deterministic pattern, e.g. by choosing the code with the largest Hamming distance to any used code. Then, as a block 127, the selected code is used as a spreading code when transmitting local CPC information in order to distinguish the transmission from e.g. transmissions from other local CPC transmitters. The method ends at a block 129, but may of course be repeated any number of times.

Figure 10:
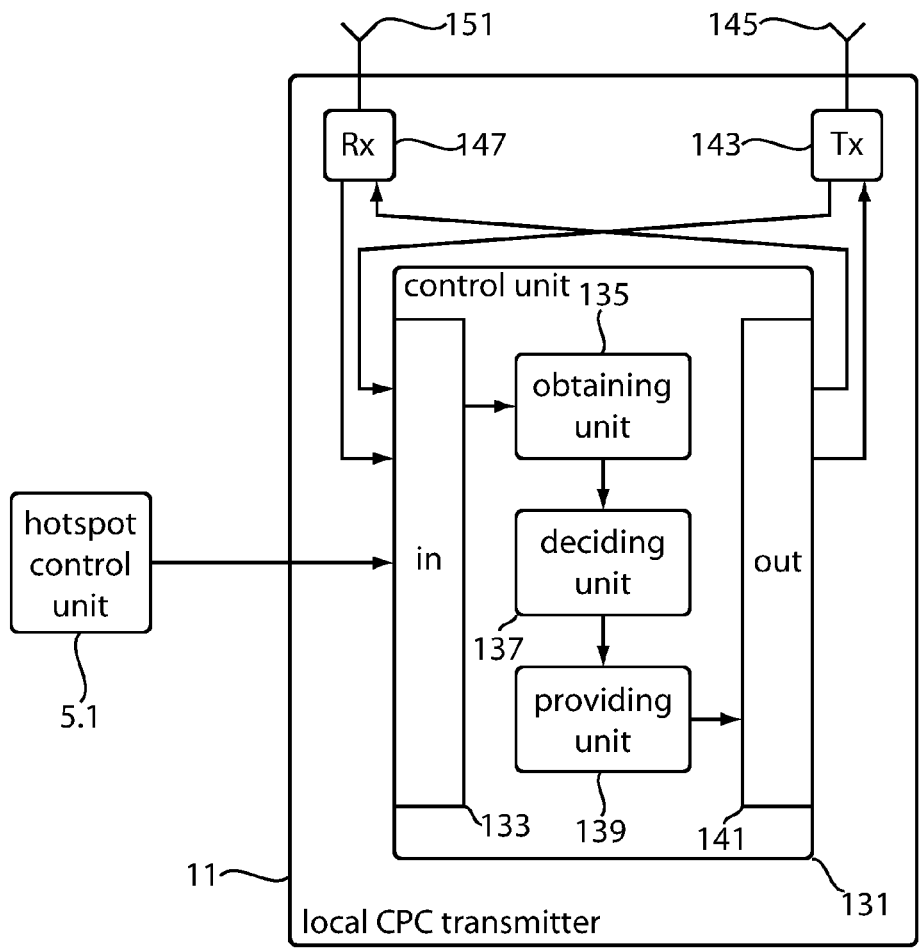
FIG. 10 is block diagram illustrating a design of a local CPC transmitter in accordance with exemplary embodiments.

FIG. 10 is a block diagram which illustrates as an exemplary embodiment a design of the local CPC transmitter 11. Here, the local CPC transmitter 11 comprises a control unit 131, which is configured to control an operation of the local CPC transmitter 11. In particular, the control unit 131 may be configured to control the local CPC transmitter 11 to perform any of the methods disclosed and indicated earlier.

The control unit 131 comprises an input interface 133. In this exemplary embodiment, the control unit 131 further comprises an obtaining unit 135, which is responsible for obtaining data which is used by the control unit 131. In this example, the control unit 131 also comprises a deciding unit 137 connected to the obtaining unit 135 and configured to take operational decisions based on the data collected by the obtaining unit 135. Moreover, the control unit 131 comprises a providing unit 139, which is configured to provide other parts of the local CPC transmitter 11 with, for example, data and control information in appropriate format via an output interface 141. The local CPC transmitter further comprises a transmitter 143 connected to an antenna 145 and a receiver 147 (optional) connected to an antenna 151.

The control unit 131, e.g. through the obtaining unit 135, of the local CPC transmitter 11 is configured to obtain local CPC information. In the example of FIG. 10, the obtaining unit 135 is configured to obtain the local CPC information from a hotspot served by the local CPC transmitter 11. For example, the local CPC information may be retrieved from a hotspot control unit 5.1, as indicted in the figure. The deciding unit 137 may make a decision to transmit the obtained local CPC information. The deciding unit 137 then instructs the providing unit 139 to provide the transmitter 143 with the local CPC information in a format suitable for transmission. In response to receiving the local CPC information from the providing unit 139, the transmitter 143 transmits the local CPC information in area that essentially corresponds to the coverage area of the served hotspot. The transmission may be made using any one of the transmission modes disclosed and indicated earlier and may involve the use of a resource sharing scheme as disclosed and indicated earlier.

In particular embodiments, the local CPC transmitter 11 of FIG. 10 may employ an overlay approach for the transmission of local CPC information. The transmitter 143 is then configured to transmit the local CPC information using radio resources that are reserved for use in outband broadcast CPC transmissions. In particular embodiments, the nice overlay transmission scheme may be used. The control unit 131, e.g. through the obtaining unit 135, is then configured to obtain AE location information. For example, the AE location information may be obtained from outband broadcast CPC transmissions received by the receiver 147, or from some other location, such as a database either stored locally or accessed over the Internet. The control unit 131, e.g. through the deciding unit 137, is configured for identifying based on the area element location information one or more area elements which have a distance to the hotspot which is greater than a threshold value. Preferred non-limiting ways of determining the threshold value will be described below. The control unit 131, e.g. through the deciding unit 137, is then configured for identifying, for at least one identified area element, the outband broadcast CPC radio resources allocated for that area element. The transmitter 143 is then configured to transmit the local CPC information using at a least a portion of the identified allocated radio resources. In a particular embodiment, the providing unit 139 may send control data to the transmitter 143 in order to configure the radio resource usage of the transmitter 143.

The design of the control unit 131 of FIG. 10 is only by way of example, and the persons skilled in the art will appreciate that other designs are equally well applicable. For example, although the control unit 131 is illustrated a residing in one location, it may be noted that the control unit 131 may also be provided in a distributed design where the control unit 131 is divided so that it resides in several different but communicating locations of the local CPC transmitter 11. The persons skilled in the art will also appreciate that the control unit 131 may be implemented with any suitable digital processing circuitry. In particular, the control unit may be implemented using conventional circuit technologies, which exist in profusion. For example, the control unit may be implemented using individual hardware components, application specific integrated circuitry, programmable circuitry, or any combination thereof. The control unit 131 may also entirely or partly be implemented with one or more digital processors programmed with suitable software.

Figure 11:
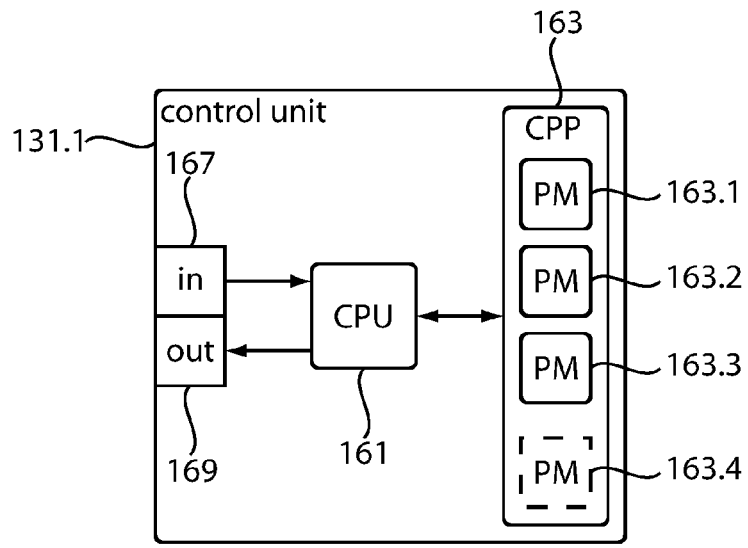
FIG. 11 is a block diagram illustrating a design variant of a control unit for a local CPC transmitter in accordance with an exemplary embodiment.

FIG. 11 is a block diagram illustrating one particular variant, here referenced with reference numeral 131.1, of the control unit 131 of FIG. 10. The control unit 131.1 is based on a digital processor 161 which operates based on program modules stored on computer program product 163 (CPP), such as suitable computer memory. In this example, the computer program product 163 comprises program modules 163.1-163.3. The program module 163.1 comprises program instructions for causing the digital processor 161 to perform functions corresponding to those performed by the obtaining unit 135. The program module 163.2 comprises program instructions causing the digital processor 161 to perform functions corresponding to those performed by the deciding unit 137. The program module 163.3 comprises program instructions causing the digital processor 161 to functions corresponding to those performed by the providing unit 139. The processor 161 is connected to the surroundings by means of an input interface 167 and an output interface 169. The computer program product 163 may optionally include one or more further program modules 163.4 with program instructions for causing the digital processor 161 to perform additional tasks.

Figure 12:
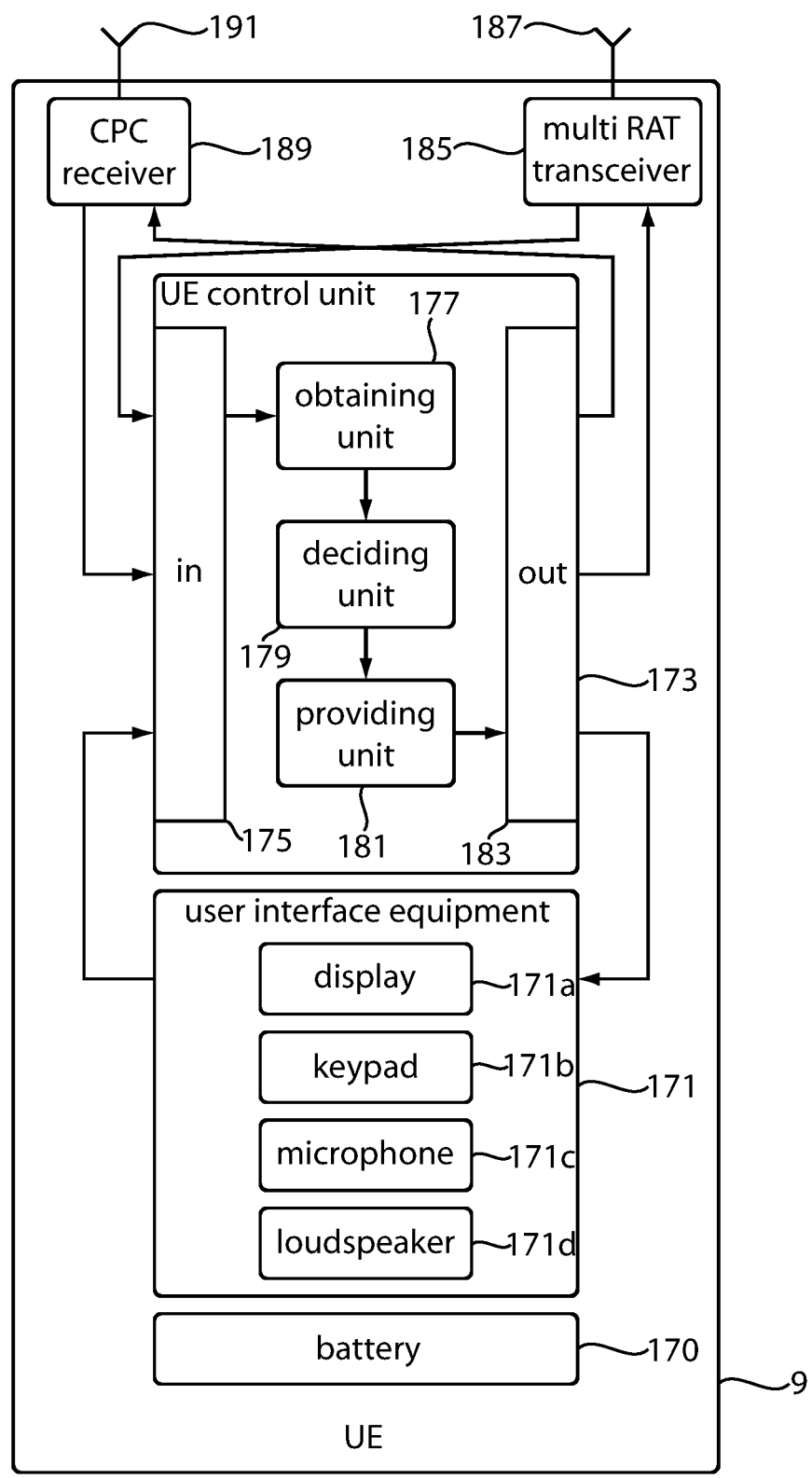
FIG. 12 is a block diagram illustrating a design of user equipment in accordance with exemplary embodiments.

FIG. 12 is a block diagram illustrating as an exemplary embodiment a design of the user equipment UE 9. The UE 9 comprises in this example a power source, here in the form of a battery 170. Moreover, the UE 9 comprises user interface equipment 171 (optional) by which a user may interact with the UE 9. In the example of FIG. 12, the user interface equipment 171 comprises a display 171a, a keypad 171b, a microphone 171c and a loudspeaker 171d. The UE 9 further comprises a control unit 173, which is configured to control an operation of the UE 9. In particular, the control unit 173 may be configured to control the UE 9 to perform any of the methods relating to the obtaining and use of local CPC information disclosed and indicated earlier. The control unit 173 comprises an input interface 175. In the embodiment of FIG. 12, the control unit 173 further comprises an obtaining unit 177, which is responsible for obtaining data which is used by the control unit 173. In this example, the control unit 173 also comprises a deciding unit 179 connected to the obtaining unit 177 and configured to take operational decisions based on the data collected by the obtaining unit 177. Moreover, the control unit 173 comprises a providing unit 181, which is configured to provide other parts of the UE 9 with, for example, data and control information in appropriate format via an output interface 183. The UE 9 further comprises a multi RAT transceiver 185, here connected to one or more antennas 187, and a CPC receiver 189, here connected to an antenna 191. The CPC receiver is in this embodiment configured to so that it may receive CPC information from transmissions from an outband broadcast CPC transmitter and local CPC information from a local CPC transmitter, such as the local CPC transmitter 11.

According to exemplary embodiments, the control unit 173, e.g. through the obtaining unit 177, is configured to obtain local CPC information received via CPC receiver 189 from transmissions from a local CPC transmitter. The local CPC information may be obtained in response to a decision, e.g. by the deciding unit 179 to connect to a hotspot served by the local CPC transmitter. The obtained local CPC information may then be used by the multi RAT transceiver 185 to facilitate quick connection to the hotspot. Alternatively or additionally, the local CPC information may be obtained and stored in a memory (not shown) for subsequent use, should a need to connect to the hotspot arise at a later time.

The design of the control unit 173 of FIG. 12 is only by way of example, and the persons skilled in the art will appreciate that other designs are equally well applicable. For example, although the control unit 173 is illustrated a residing in one location, it may be noted that the control unit 173 may also be provided in a distributed design where the control unit 173 is divided so that it resides in several different but communicating locations of the UE 9. The persons skilled in the art will also appreciate that the control unit 173 may be implemented with any suitable digital processing circuitry. In particular, the control unit may be implemented using conventional circuit technologies, which exist in profusion. For example, the control unit may be implemented using individual hardware components, application specific integrated circuitry, programmable circuitry, or any combination thereof. The control unit 173 may also entirely or partly be implemented with one or digital processors programmed with suitable software.

Figure 13:
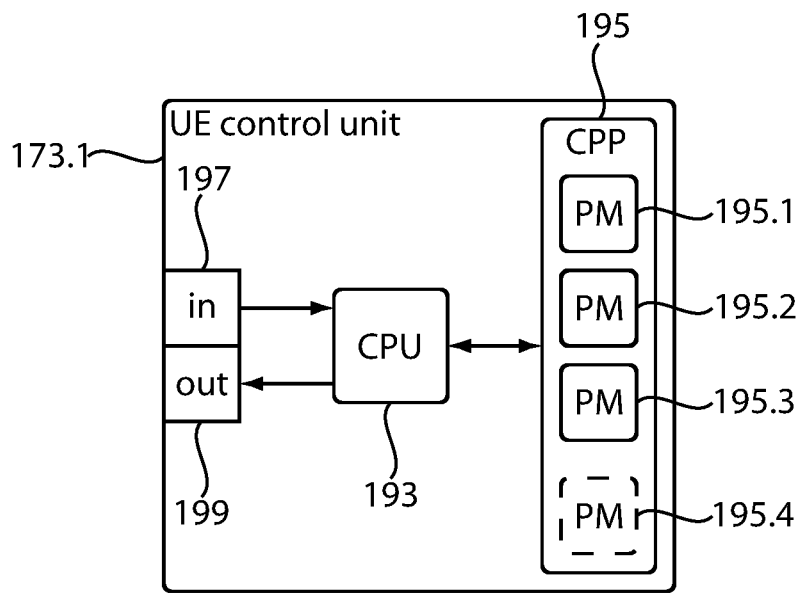
FIG. 13 is a block diagram illustrating a design variant of a control unit for a user equipment in accordance with an exemplary embodiment.

FIG. 13 is a block diagram illustrating one particular variant, here referenced with reference numeral 173.1, of the control unit 173 of FIG. 12. The control unit 173.1 is based on a digital processor 193 which operates based on program modules stored on computer program product 195, such as suitable computer memory. In this example, the computer program product 195 comprises program modules 195.1-195.3. The program module 195.1 comprises program instructions for causing the digital processor 193 to perform functions corresponding to those performed by the obtaining unit 177. The program module 195.2 comprises program instructions causing the digital processor 193 to perform functions corresponding to those performed by the deciding unit 179. The program module 195.3 comprises program instructions causing the digital processor 193 to perform functions corresponding to those performed by the providing unit 181. The processor 193 is connected to the surroundings by means of an input interface 197 and an output interface 199. The computer program product 195 may optionally include one or more further program modules 195.4 with program instructions for causing the digital processor 193 to perform additional tasks.

To protect an operation of an outband broadcast CPC transmitter, such as the outband broadcast CPC transmitter 1, it is desirable that the transmissions from a local CPC transmitter, such as the local CPC transmitter 11, do not interfere with the transmission of CPC information from the outband broadcast CPC transmitter for those UEs that potentially could be interested in the CPC information transmitted by the outband broadcast CPC transmitter. Herein, the reasonable assumption is made that UEs further away than a distance interest margin, $d_{im}$, from a given AE are not interested in CPC information corresponding to that AE. The distance interest margin $d_{im}$ is thus indicative of a distance from a boarder of an area element AE within which UEs are likely to potentially need use of wireless services provided in the area element AE. The reason why a UE may be interested in the CPC information relating to an AE located nearby is, of course, that the UE may be moving towards that AE. Note that $d_{im}$ may vary from AE to AE, although a common value may also be used in order to reduce complexity. The size of $d_{im}$ is a design parameter which may be set by an operator of the local CPC transmitter based on parameters relating to the AE for which the distance interest margin is determined. Variables which may affect the value of $d_{im}$ are: a periodicity of the transmission of CPC information (when the outband broadcast CPC transmitter is expected to repeat the CPC information for an AE) and an expected distribution of UE speeds in a vicinity of the AE (is the AE located on a freeway or in a city centre?). In order for an AE to be sufficiently far away from a local CPC transmitter, for purposes of nice overlay transmissions, an estimated distance to the AE should, as explained earlier, exceed a threshold value d. AEs which are closer to the local CPC transmitter than the threshold d are consequently deemed to be too close for reliable local CPC overlay transmission, so when the outband broadcast CPC transmitter is transmitting CPC information corresponding to these AEs, the local CPC transmitter should not transmit local CPC information using the radio resources allocated for communicating CPC information relating to these AEs.

According to one non-limiting embodiment, the threshold value d is set to $d_{th}+d_{im}$. Here, $d_{th}$ is a distance threshold indicative of a distance to the local CPC transmitter beyond which interference from the local CPC transmitter is negligible compared to background noise. Preferable examples of how to calculate the distance threshold $d_{th}$ will be given soon.

Figure 16:
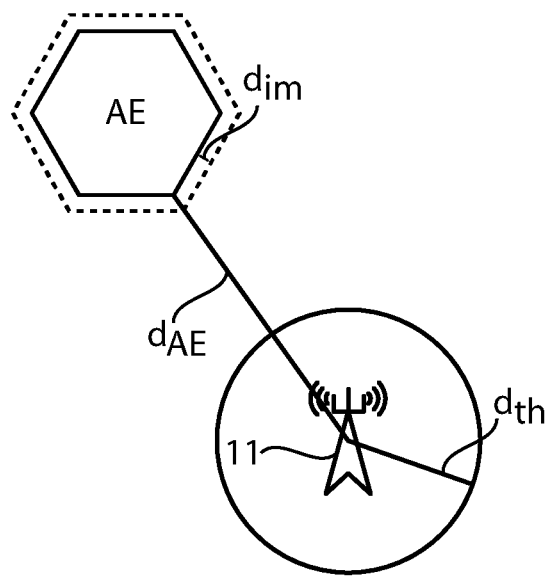
FIG. 16 is a schematic view illustrating significance of specific parameters used in exemplary embodiments.

FIG. 16 is schematic view which provides an exemplary illustration of the parameters $d_{im}$, $d_{AE}$ and $d_{th}$, where $d_{AE}$ is the distance from the local CPC transmitter 11 to the nearest point on an AE (see below). Here, the local CPC transmitter 11 is shown. The distance threshold $d_{th}$ can be seen to generate a circle with its centre located at the local CPC transmitter 11. At locations outside the circle, interference generated by the local CPC transmitter 11 is negligible compared to background noise or background noise plus the outband broadcast CPC transmitter signal. The FIG. 16 also shows one AE, which is drawn as a solid line hexagonal. The distance margin $d_{im}$ can be seen to have the effect of extending the AE outwardly into a dashed line hexagonal, as illustrated in the figure. Any UE with a location within the dashed line hexagonal is assumed to have a potential interest in accessing wireless communication services provided in the AE. Such a UE should of course not be interfered by the local CPC transmitter 11. Therefore, the circle and the dashed line hexagonal should not overlap. This condition can also be expressed based on a distance $d_{AE}$ between the local CPC transmitter 11 and the AE, that is, $d_{AE} > d = d_{im} + d_{th}$.

Figure 17:
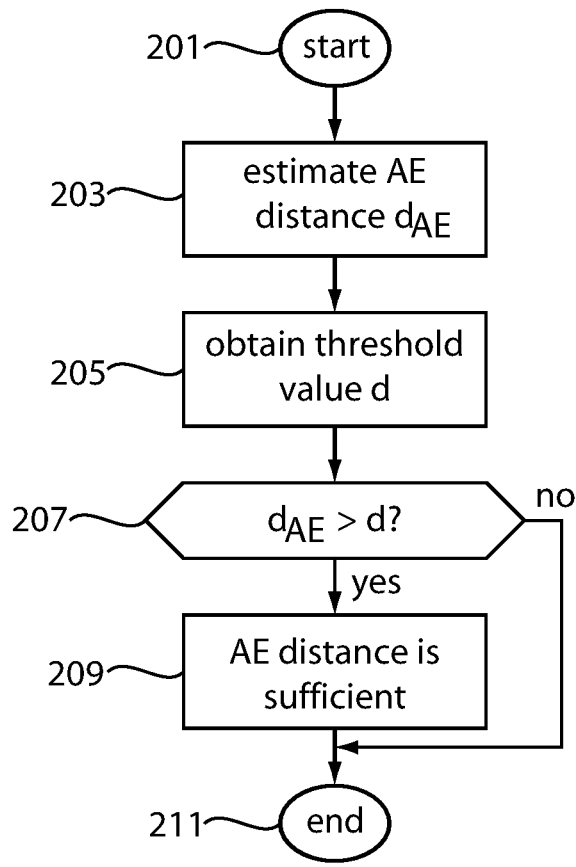
FIG. 17 is a flowchart illustrating evaluation of distance between a local CPC transmitter and an area element in accordance with an exemplary embodiment.

FIG. 17 is a flowchart illustrating an exemplary embodiment on how to determine whether a distance between a local CPC transmitter, such as the local CPC transmitter 11, and an AE is sufficient e.g. for purposes of "nice" overlay transmissions. After as start 201, the local CPC transmitter obtains at a block 203 an estimate of a distance $d_{AE}$ between the local CPC transmitter and the AE, for example, based on area element location information relating to the AE. At a block 205, the local CPC transmitter further obtains the above-mentioned threshold value d. The threshold value d may, for example, be based on a distance interest margin $d_{im}$ associated with the AE and a distance threshold $d_{th}$ associated with the local CPC transmitter, as discussed earlier. Then, at a block 207, the local CPC transmitter compares the estimated distance to the threshold value d, and based on this comparison the local CPC transmitter determines whether or not the distance to the AE is sufficient. In this particular embodiment, the local CPC transmitter determines, at a block 209, that the distance is sufficient when $d_{AE}$ exceeds d. The method then ends at a block 211. If, instead, $d_{AE}$ does no exceed d, the distance is of course not sufficient, and the method ends directly after the block 207. The method of FIG. 17 can of course be repeated to cover any desired number of AEs.

When the local CPC transmitter has many radio resources to choose from for its transmission of local CPC information and does not intend to include all of these radio resources in the active radio resources, it would ideally choose the radio resources which are intended for transmissions of CPC information relating to the AEs which are at the greatest distance from the local CPC transmitter. This will minimize the risk of creating harmful interference to the UEs interested in that outband broadcast CPC transmission. Additionally, some diversity in selection of the AEs to overlap with could be beneficial, e.g., for resource sharing with other local CPC transmitters as discussed above.

In the following one non-limiting embodiment of a procedure to appropriately choose the distance threshold $d_{th}$ will be described with reference to FIGS. 18 and 19.

Figure 18:
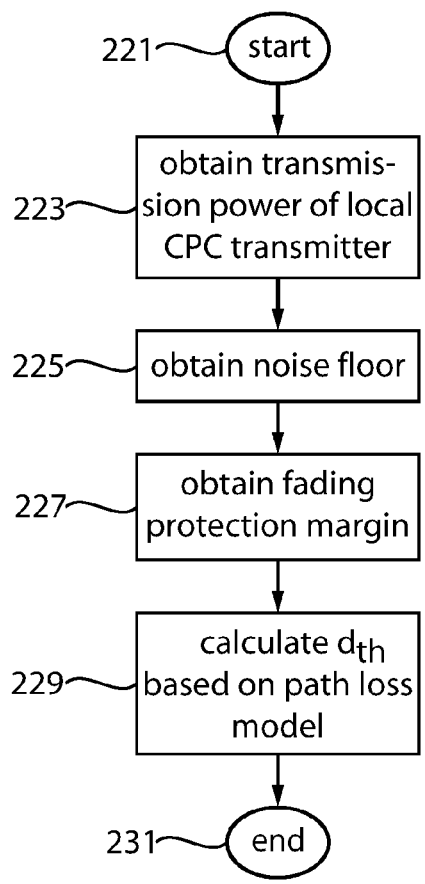
FIG. 18 is a flowchart illustrating a method of determining a threshold parameter in accordance with an exemplary embodiment.
Figure 19:
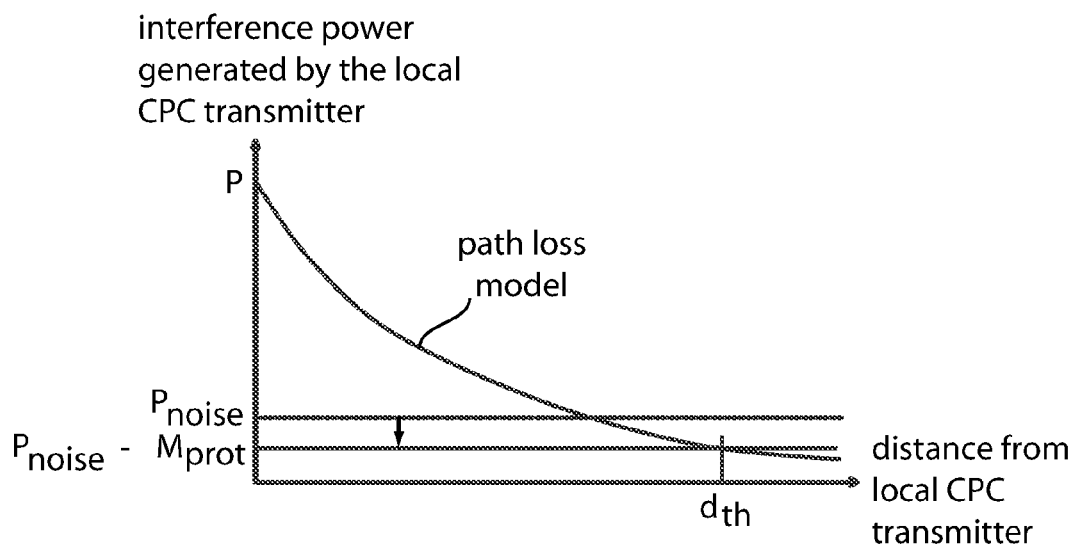
FIG. 19 is a power diagram illustrating determination of a threshold parameter in accordance with an exemplary embodiment.

FIG. 18 is flowchart that illustrates an embodiment of a method for determining distance threshold $d_{th}$. It is here assumed, by way of example, that the method is performed in a local CPC transmitter, such as the local CPC transmitter 11. After a start 221, the local CPC transmitter obtains its transmission power P at a block 223. At a block 225, the local CPC transmitter obtains, e.g. by measurements or from a database, information about a noise floor $P_{noise}$. The local CPC transmitter further obtains information about a fading protection margin $M_{prot}$ at a block 227. The value of $M_{prot}$ may be set by an operator of the local CPC transmitter and may be based on measurements in the environment or on a standard model for fading. $M_{prot}$ may also simply be a default value. A reasonable default value of $M_{prot}$ could be 3 dB. At a block 229, the local CPC transmitter calculates the distance threshold $d_{th}$ based on a path loss model. The local CPC transmitter may use a standard path loss model (e.g. free space, or the 2 ray urban or the Hata model, or some other appropriate model for the propagation characteristics of transmissions) to calculate at which distance where its emitted signals will no longer be above the noise floor minus the fading protection margin $M_{prot}$. This is illustrated with a diagram in FIG. 19. Here, the path loss model together with the obtained transmission power P induces a curve that illustrates how an interfering signal power of a transmission from the local CPC transmitter changes with the distance from the local CPC transmitter. The noise floor $P_{noise}$ is represented by a horizontal line, and the fading protection margin $M_{prot}$ can be seen to have the effect of shifting down this line by an amount corresponding to the fading protection margin $M_{prot}$ so as to produce a down shifted line. The distance threshold $d_{th}$ is determined as the distance from the local CPC transmitter where the curve intersects the downshifted line, that is, the signal power of the transmission from the local CPC transmitter equals $P_{noise} - M_{prot}$ at this distance from the local CPC transmitter. After the block 229, the method ends at a block 231.

Above, the invention has been illustrated using various embodiments. These embodiments are, however, intended only as non-limiting examples and the scope of protection is instead defined by appending claims.

The invention claimed is:

1. A method by a device for facilitating connection to a wireless hotspot having an associated coverage area, comprising:
obtaining local Cognitive Pilot Channel (CPC) information relating to the hotspot; and
transmitting the local CPC information in an area corresponding to the coverage area of the hotspot, wherein the coverage area of the hotspot is at least in part within a coverage area of an outband broadcast CPC transmitter, the coverage area of the outband broadcast CPC transmitter being divided into a number of area elements (AE 1, . . . , AE n−1, AE n);
the method further comprising:
obtaining area element location information from the CPC information comprising a location information field for each specific area element, wherein the area element location information comprises a global positioning system (GPS) coordinate;
identifying at least one area element that has a distance to the hotspot greater than a threshold value, wherein
the local CPC information is transmitted using outband broadcast CPC radio resources allocated for the at least one area element.

2. The method according to claim 1, wherein the step of transmitting comprises transmitting the local CPC information using radio resources that are reserved for use in outband broadcast CPC transmissions.

3. The method according to claim 2, wherein outband broadcast CPC information relating to each area element is transmitted using outband broadcast CPC radio resources allocated for this purpose, and wherein the method further comprises:
identifying, based on the area element location information, at least one area element that has a distance to the hotspot greater than the threshold value; and
for the at least one identified area element, identifying the outband broadcast CPC ratio resources allocated for that area element.

4. The method according to claim 3, wherein the threshold value is based on a distance interest margin of one or more area elements and a distance threshold indicative of a distance to the device beyond which interference caused by the transmission of local CPC information is negligible compared to background noise.

5. The method according to claim 4, wherein the threshold value equals a sum of the distance interest margin and the distance threshold.

6. The method according to claim 1, wherein the step of transmitting comprises transmitting the local CPC information using a resource sharing scheme that shares radio resources with transmissions of local CPC information relating to one or more other wireless hotspots.

7. The method according to claim 6, wherein the resource sharing scheme comprises using a spreading code to distinguish the local CPC information relating to the hotspot from the local CPC information relating to the one or more other wireless hotspots.

8. The method according to claim 6, wherein the resource sharing scheme comprises a slotted Carrier Sense Multiple Access (CSMA) scheme.

9. The method according to claim 6, wherein the resource sharing scheme comprises a randomized selection of radio resources to be used for the transmitting of the local CPC information.

10. The method according to claim 1, wherein the local CPC information comprises information that allows a user equipment to connect to the hotspot without using frequency scanning.

11. A method for a wireless user equipment, comprising:
receiving a transmission of local Cognitive Pilot Channel (CPC) information relating to a wireless hotspot, wherein the local CPC information comprises information about at least one of radio access technologies (RATs) and frequency ranges (FRs) used by the hotspot, wherein the wireless user equipment obtains area element location information from the CPC information comprising a location information field for each specific area element, wherein the location information field comprises a global positioning system (GPS) coordinate; and
connecting to the hotspot using the received CPC information, wherein
the coverage area of the hotspot is at least in part within a coverage area of an outband broadcast CPC transmitter, the coverage area of the outband broadcast CPC transmitter being divided in to a number of area elements (AE 1, . . . , AE n−1, AE n), and wherein
the local CPC information is received using at least a portion of radio resources allocated for at least one area element which has a distance to the hotspot greater than a threshold value.

12. A device for facilitating connection to a wireless hotspot having an associated coverage area, comprising:
a processor configured to obtain local Cognitive Pilot Channel (CPC) information relating to the hotspot; and
a transmitter configured to transmit the local CPC information in an area corresponding to the coverage area of the hotspot, wherein
the device is configured to operate at least in part within a coverage area of an outband broadcast CPC transmitter, the coverage area of the outband broadcast CPC transmitter being divided into a number of area elements (AE 1, . . . , AE n−1, AE n), and wherein the processor is further configured to:
obtain the local CPC information comprises location information for the at least one area element, wherein the location information comprises a global positioning system (GPS) coordinate;
identify at least one of the area elements that has a distance to the hotspot greater than a threshold value, wherein
the transmitter is configured to transmit the local CPC information using outband CPC radio resources allocated for the at least one area element.

13. The device according to claim 12, wherein the transmitter is configured to transmit the local CPC information using radio resources that are reserved for use in outband broadcast CPC transmissions.

14. The device of claim 13, wherein outband broadcast CPC information relating to each area element is transmitted using outband broadcast CPC radio resources allocated for this purpose, and wherein the processor is configured to:
identify, based on the area element location information, the at least one area element that has a distance to the hotspot greater than the threshold value; and
identify, for the at least one identified area element, the outband broadcast CPC radio resources allocated for that area element.

15. The device according to claim 14, wherein the threshold value is based on a distance interest margin of one or more area elements and a distance threshold indicative of a distance to the device beyond which interference caused by the transmission of local CPC information is negligible compared to background noise.

16. The device according to claim 15, wherein the threshold value equals a sum of the distance interest margin and the distance threshold.

17. The device according to claim 12, wherein the transmitter is configured to transmit the local CPC information using a resource sharing scheme that shares radio resources with transmissions of local CPC information relating to one or more other wireless hotspots.

18. A user equipment comprising:
- a receiver configured to receive a transmission of local Cognitive Pilot Channel (CPC) information relating to a wireless hotspot, wherein the local CPC information comprises information about at least one of radio access technologies (RATs) and frequency ranges (FRs) used by the hotspot; and
- a transceiver configured to connect to the hotspot using the received local CPC information, wherein the coverage area of the hotspot is at least in part within a coverage area of an outband broadcast CPC transmitter, the coverage area of the outband broadcast CPC transmitter being divided into a number of area elements (AE 1, . . . , AE n−1, AE n), wherein the local CPC information is received using at least a portion of radio resources allocated for at least one area element which has a distance to the hotspot greater than a threshold value, wherein the user equipment obtains area element location information from the local CPC information comprising a location information field for each specific area element, wherein the area element location information comprises a global positioning system (GPS) coordinate.

* * * * *